United States Patent
Fagg et al.

(10) Patent No.: US 8,385,666 B2
(45) Date of Patent: Feb. 26, 2013

(54) CLASSIFICATION AND ENCODER SELECTION BASED ON CONTENT

(75) Inventors: Graham Edward Fagg, Monroe, WA (US); Nadim Y. Abdo, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 400 days.

(21) Appl. No.: 12/751,065

(22) Filed: Mar. 31, 2010

(65) Prior Publication Data

US 2011/0243433 A1 Oct. 6, 2011

(51) Int. Cl.
*G06K 9/36* (2006.01)

(52) U.S. Cl. ........................................................ 382/239

(58) Field of Classification Search .......... 382/232–233, 382/236, 239–240, 244; 345/619; 704/500, 704/504; 709/203–204, 233, 246
See application file for complete search history.

(56) References Cited

U.S. PATENT DOCUMENTS

| | | | |
|---|---|---|---|
| 5,970,233 A | 10/1999 | Liu et al. | |
| 6,263,313 B1 | 7/2001 | Wilsted et al. | |
| 7,024,045 B2 | 4/2006 | McIntyer | |
| 7,171,444 B2 | 1/2007 | Deshpande | |
| 7,656,318 B2 * | 2/2010 | Guleryuz et al. | 341/51 |
| 2006/0072831 A1 | 4/2006 | Pallister | |
| 2006/0203007 A1 | 9/2006 | Bullard et al. | |
| 2007/0220168 A1 | 9/2007 | Parsons et al. | |
| 2008/0005236 A1 | 1/2008 | Schmieder | |
| 2008/0049597 A1 | 2/2008 | Walker et al. | |
| 2008/0181400 A1 | 7/2008 | Guleryuz et al. | |
| 2008/0205389 A1 | 8/2008 | Fang et al. | |
| 2009/0327918 A1 | 12/2009 | Aaron et al. | |

OTHER PUBLICATIONS

Rauschenbach et al., "Adaptive Image Transmission," Feb. 10-14, 1997, 13 pgs, downloaded Jan. 7, 2010, http://citeseerx.ist.psu.edu/viewdoc/download?doi=10.1.1.22.7522&rep=rep1&type=pdf.

Madden, B., "Remote Display Protocols for VDI: Will RDP Be Enough," Nov. 5, 2007, 3 pgs, downloaded Jan. 7, 2010, http://www.brianmadden.com/blogs/brianmadden/archive/2007/11/05/remote-display-protocols-for-vdi-will-rdp-be-enough.aspx.

"Remote Desktop Protocol (RDP)—Technical Analysis," Retrieved Dec. 31, 2009, 7 pgs, downloaded Jan. 7, 2010, http://www.itraction.nl/nl/working-online-met-intraction-oplossingen-rdp.

International Application No. PCT/US2011/029111, International Search Report and Written Opinion of the International Searching Authority, Dec. 7, 2011, 13 pages.

* cited by examiner

*Primary Examiner* — Jose Couso
(74) *Attorney, Agent, or Firm* — Woodcock Washburn LLP

(57) ABSTRACT

In various embodiments, methods and systems are disclosed for dynamic runtime implementation and end-to-end biased tuning of a two stage image classification system based on a decision function that uses network packet sizes and multiple image characteristics to determine the selection of an encoding codec to reduce overall network bandwidth consumption.

20 Claims, 13 Drawing Sheets

CLASSIFICATION AND ENCODER SELECTION BASED ON CONTENT

BACKGROUND

Remote computing systems can enable users to remotely access hosted resources. Servers on the remote computing systems can execute programs and transmit signals indicative of a user interface to clients that can connect by sending signals over a network conforming to a communication protocol such as the TCP/IP protocol. Each connecting client may be provided a remote presentation session, i.e., an execution environment that includes a set of resources. Each client can transmit signals indicative of user input to the server and the server can apply the user input to the appropriate session. The clients may use remote presentation protocols such as the Remote Desktop Protocol (RDP) to connect to a server resource.

Remote presentation compression algorithms are employed to reduce the bandwidth of the display stream to levels that are acceptable for transmission over local area networks, wide area networks, and low-bandwidth networks. Such algorithms typically trade off CPU time on the server side for a lower required bandwidth. Compression algorithms may work well on certain image content. However, the algorithms may perform poorly on other types of content. For example, compression algorithms may work well on text but not on natural images. The output of these compression encoders may not the final stage to the network as there may be other layers involved such as bulk compression and remote presentation packet encapsulation. These other layers may also effect overall bandwidth usage. In some cases an image that encodes well with one bitmap encoder (codec) may compresses poorly with the remote presentation bulk compressor prior to network transmission.

SUMMARY

To lower overall network bandwidth usage, an encoding method may be selected based on how the image content relates to the final bandwidth used rather than using predetermined selection criteria for text, simple/block diagrams, natural images, and the like. Rather than providing a classifier and target (sub) codecs for each possible classified output, the output may be classified based on a range using multiple image and compression characteristics. A decision function may then be tuned based on the network traffic conditions.

In various embodiments, methods and systems are disclosed for the dynamic runtime implementation and end-to-end biased tuning of a two stage image classification system based on a decision function that uses network packet sizes and multiple image characteristics to determine the selection of an encoding codec to reduce overall network bandwidth consumption.

BRIEF DESCRIPTION OF THE DRAWINGS

The systems, methods, and computer readable media for altering a view perspective within a virtual environment in accordance with this specification are further described with reference to the accompanying drawings in which.

DETAILED DESCRIPTION

Computing Environments in General Terms

Certain specific details are set forth in the following description and figures to provide a thorough understanding of various embodiments of the disclosure. Certain well-known details often associated with computing and software technology are not set forth in the following disclosure to avoid unnecessarily obscuring the various embodiments of the disclosure. Further, those of ordinary skill in the relevant art will understand that they can practice other embodiments of the disclosure without one or more of the details described below. Finally, while various methods are described with reference to steps and sequences in the following disclosure, the description as such is for providing a clear implementation of embodiments of the disclosure, and the steps and sequences of steps should not be taken as required to practice this disclosure.

Figure 1:
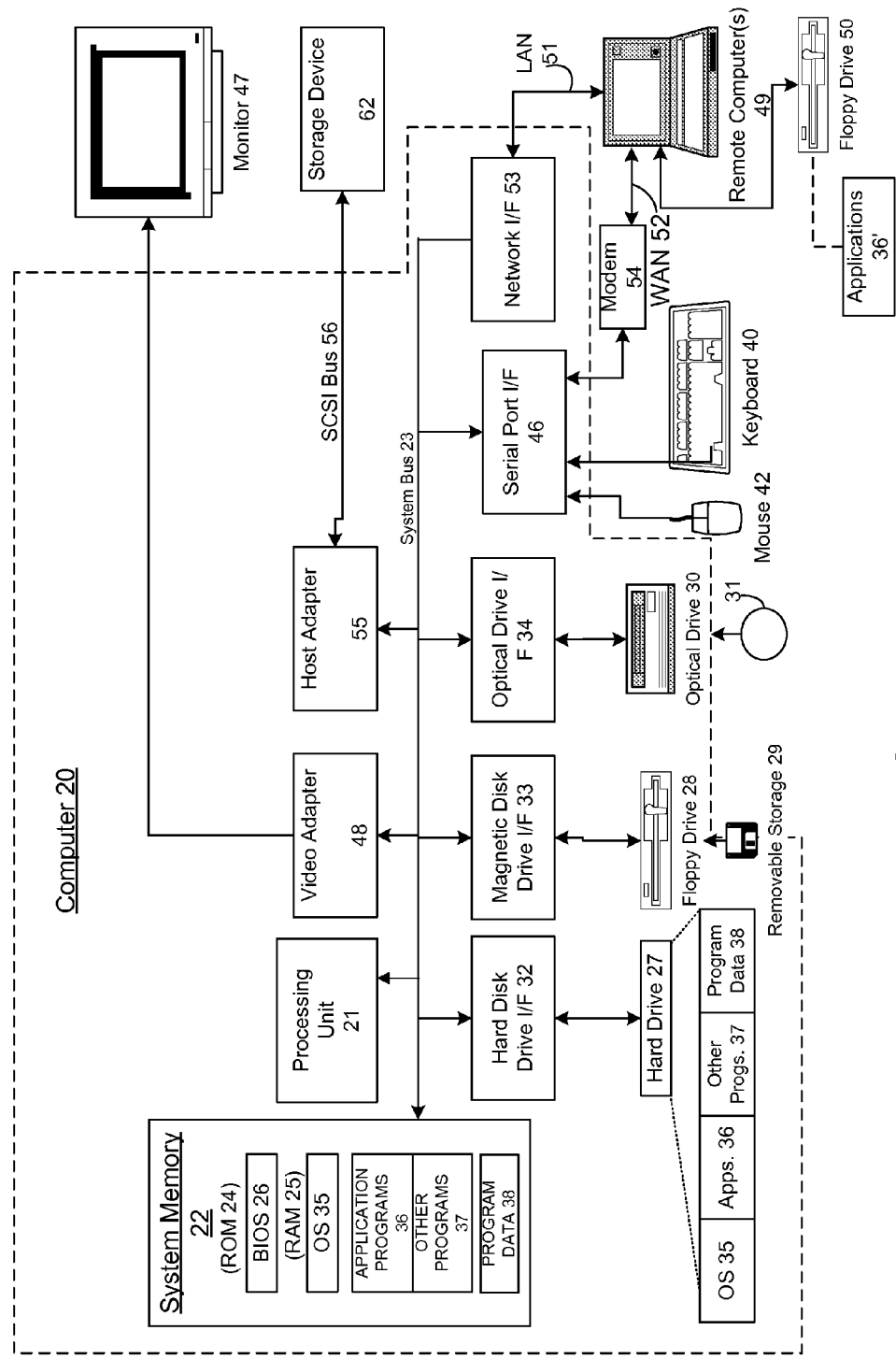
FIGS. 1 and 2 depict an example computer system wherein aspects of the present disclosure can be implemented.
Figure 2:
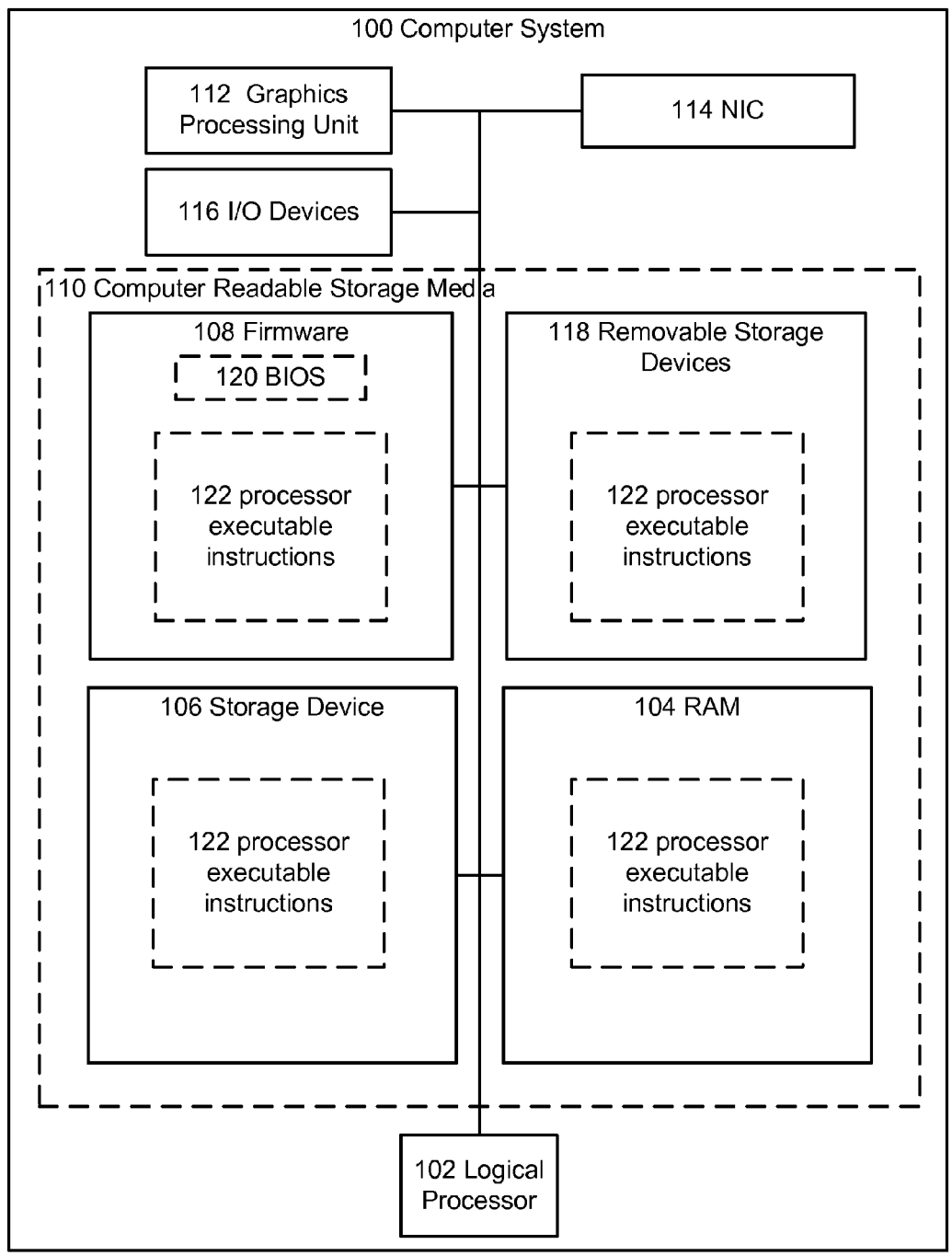

Embodiments may execute on one or more computers. FIGS. 1 and 2 and the following discussion are intended to provide a brief general description of a suitable computing environment in which the disclosure may be implemented. One skilled in the art can appreciate that computer systems 200, 300 can have some or all of the components described with respect to computer 100 of FIGS. 1 and 2.

The term circuitry used throughout the disclosure can include hardware components such as hardware interrupt controllers, hard drives, network adaptors, graphics processors, hardware based video/audio codecs, and the firmware/software used to operate such hardware. The term circuitry can also include microprocessors configured to perform function(s) by firmware or by switches set in a certain way or one or more logical processors, e.g., one or more cores of a multi-core general processing unit. The logical processor(s) in this example can be configured by software instructions embodying logic operable to perform function(s) that are loaded from memory, e.g., RAM, ROM, firmware, and/or virtual memory. In example embodiments where circuitry includes a combination of hardware and software an implementer may write source code embodying logic that is subsequently compiled into machine readable code that can be executed by a logical processor. Since one skilled in the art can appreciate that the state of the art has evolved to a point where there is little difference between hardware, software, or a combination of hardware/software, the selection of hardware versus software to effectuate functions is merely a design choice. Thus, since one of skill in the art can appreciate that a software process can be transformed into an equivalent hardware structure, and a hardware structure can itself be transformed into an equivalent software process, the selection of a hardware implementation versus a software implementation is trivial and left to an implementer.

FIG. 1 depicts an example of a computing system which is configured to with aspects of the disclosure. The computing system can include a computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the computer 20, such as during start up, is stored in ROM 24. The computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. In some example embodiments, computer executable instructions embodying aspects of the disclosure may be stored in ROM 24, hard disk (not shown), RAM 25, removable magnetic disk 29, optical disk 31, and/or a cache of processing unit 21. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer readable media provide non volatile storage of computer readable instructions, data structures, program modules and other data for the computer 20. Although the environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs) and the like may also be used in the operating environment.

A number of program modules may be stored on the hard disk, magnetic disk 29, optical disk 31, ROM 24 or RAM 25, including an operating system 35, one or more application programs 36, other program modules 37 and program data 38. A user may enter commands and information into the computer 20 through input devices such as a keyboard 40 and pointing device 42. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port or universal serial bus (USB). A display 47 or other type of display device can also be connected to the system bus 23 via an interface, such as a video adapter 48. In addition to the display 47, computers typically include other peripheral output devices (not shown), such as speakers and printers. The system of FIG. 1 also includes a host adapter 55, Small Computer System Interface (SCSI) bus 56, and an external storage device 62 connected to the SCSI bus 56.

The computer 20 may operate in a networked environment using logical connections to one or more remote computers, such as a remote computer 49. The remote computer 49 may be another computer, a server, a router, a network PC, a peer device or other common network node, a virtual machine, and typically can include many or all of the elements described above relative to the computer 20, although only a memory storage device 50 has been illustrated in FIG. 1. The logical connections depicted in FIG. 1 can include a local area network (LAN) 51 and a wide area network (WAN) 52. Such networking environments are commonplace in offices, enterprise wide computer networks, intranets and the Internet.

When used in a LAN networking environment, the computer 20 can be connected to the LAN 51 through a network interface or adapter 53. When used in a WAN networking environment, the computer 20 can typically include a modem 54 or other means for establishing communications over the wide area network 52, such as the Internet. The modem 54, which may be internal or external, can be connected to the system bus 23 via the serial port interface 46. In a networked environment, program modules depicted relative to the computer 20, or portions thereof, may be stored in the remote memory storage device. It will be appreciated that the network connections shown are examples and other means of establishing a communications link between the computers may be used. Moreover, while it is envisioned that numerous embodiments of the disclosure are particularly well-suited for computer systems, nothing in this document is intended to limit the disclosure to such embodiments.

Referring now to FIG. 2, another embodiment of an exemplary computing system 100 is depicted. Computer system 100 can include a logical processor 102, e.g., an execution core. While one logical processor 102 is illustrated, in other embodiments computer system 100 may have multiple logical processors, e.g., multiple execution cores per processor substrate and/or multiple processor substrates that could each have multiple execution cores. As shown by the figure, various computer readable storage media 110 can be interconnected by one or more system busses which couples various system components to the logical processor 102. The system buses may be any of several types of bus structures including a memory bus or memory controller, a peripheral bus, and a local bus using any of a variety of bus architectures. In example embodiments the computer readable storage media 110 can include for example, random access memory (RAM) 104, storage device 106, e.g., electromechanical hard drive, solid state hard drive, etc., firmware 108, e.g., FLASH RAM or ROM, and removable storage devices 118 such as, for example, CD-ROMs, floppy disks, DVDs, FLASH drives, external storage devices, etc. It should be appreciated by those skilled in the art that other types of computer readable storage media can be used such as magnetic cassettes, flash memory cards, digital video disks, and Bernoulli cartridges.

The computer readable storage media provide non-volatile storage of processor executable instructions 122, data structures, program modules and other data for the computer 100. A basic input/output system (BIOS) 120, containing the basic routines that help to transfer information between elements within the computer system 100, such as during start up, can be stored in firmware 108. A number of programs may be stored on firmware 108, storage device 106, RAM 104, and/or removable storage devices 118, and executed by logical processor 102 including an operating system and/or application programs.

Commands and information may be received by computer 100 through input devices 116 which can include, but are not limited to, a keyboard and pointing device. Other input devices may include a microphone, joystick, game pad, scanner or the like. These and other input devices are often connected to the logical processor 102 through a serial port interface that is coupled to the system bus, but may be connected by other interfaces, such as a parallel port, game port or universal serial bus (USB). A display or other type of display device can also be connected to the system bus via an interface, such as a video adapter which can be part of, or connected to, a graphics processor 112. In addition to the display, computers typically include other peripheral output devices (not shown), such as speakers and printers. The exemplary system of FIG. 1 can also include a host adapter, Small Computer System Interface (SCSI) bus, and an external storage device connected to the SCSI bus.

Computer system 100 may operate in a networked environment using logical connections to one or more remote computers, such as a remote computer. The remote computer may be another computer, a server, a router, a network PC, a peer device or other common network node, and typically can include many or all of the elements described above relative to computer system 100.

When used in a LAN or WAN networking environment, computer system 100 can be connected to the LAN or WAN through a network interface card 114. The NIC 114, which may be internal or external, can be connected to the system bus. In a networked environment, program modules depicted relative to the computer system 100, or portions thereof, may be stored in the remote memory storage device. It will be appreciated that the network connections described here are exemplary and other means of establishing a communications link between the computers may be used. Moreover, while it is envisioned that numerous embodiments of the present disclosure are particularly well-suited for computerized systems, nothing in this document is intended to limit the disclosure to such embodiments.

A remote desktop system is a computer system that maintains applications that can be remotely executed by client computer systems. Input is entered at a client computer system and transferred over a network (e.g., using protocols based on the International Telecommunications Union (ITU) T.120 family of protocols such as Remote Desktop Protocol (RDP)) to an application on a remote desktop server. The application processes the input as if the input were entered at the remote desktop server. The application generates output in response to the received input and the output is transferred over the network to the client computer system. The client computer system presents the output data. Thus, input is received and output presented at the client computer system, while processing actually occurs at the remote desktop server. A session can include a shell and a user interface such as a desktop, the subsystems that track mouse movement within the desktop, the subsystems that translate a mouse click on an icon into commands that effectuate an instance of a program, etc. In another example embodiment the session can include an application. In this example while an application is rendered, a desktop environment may still be generated and hidden from the user. It should be understood that the foregoing discussion is exemplary and that the presently disclosed subject matter may be implemented in various client/server environments and not limited to a particular remote desktop services product.

In most, if not all remote desktop environments, input data (entered at a client computer system) typically includes mouse and keyboard data representing commands to an application and output data (generated by an application at the remote desktop server) typically includes video data for display on a video output device. Many remote desktop environments also include functionality that extend to transfer other types of data such as audio, printing commands, clipboard, and the like.

Communications channels can be used to extend the RDP protocol by allowing plug-ins to transfer data over an RDP connection. Many such extensions exist. Features such as printer redirection, clipboard redirection, port redirection, etc., use communications channel technology. Thus, in addition to input and output data, there may be many communications channels that need to transfer data. Accordingly, there may be occasional requests to transfer output data and one or more channel requests to transfer other data contending for available network bandwidth.

Figure 3:
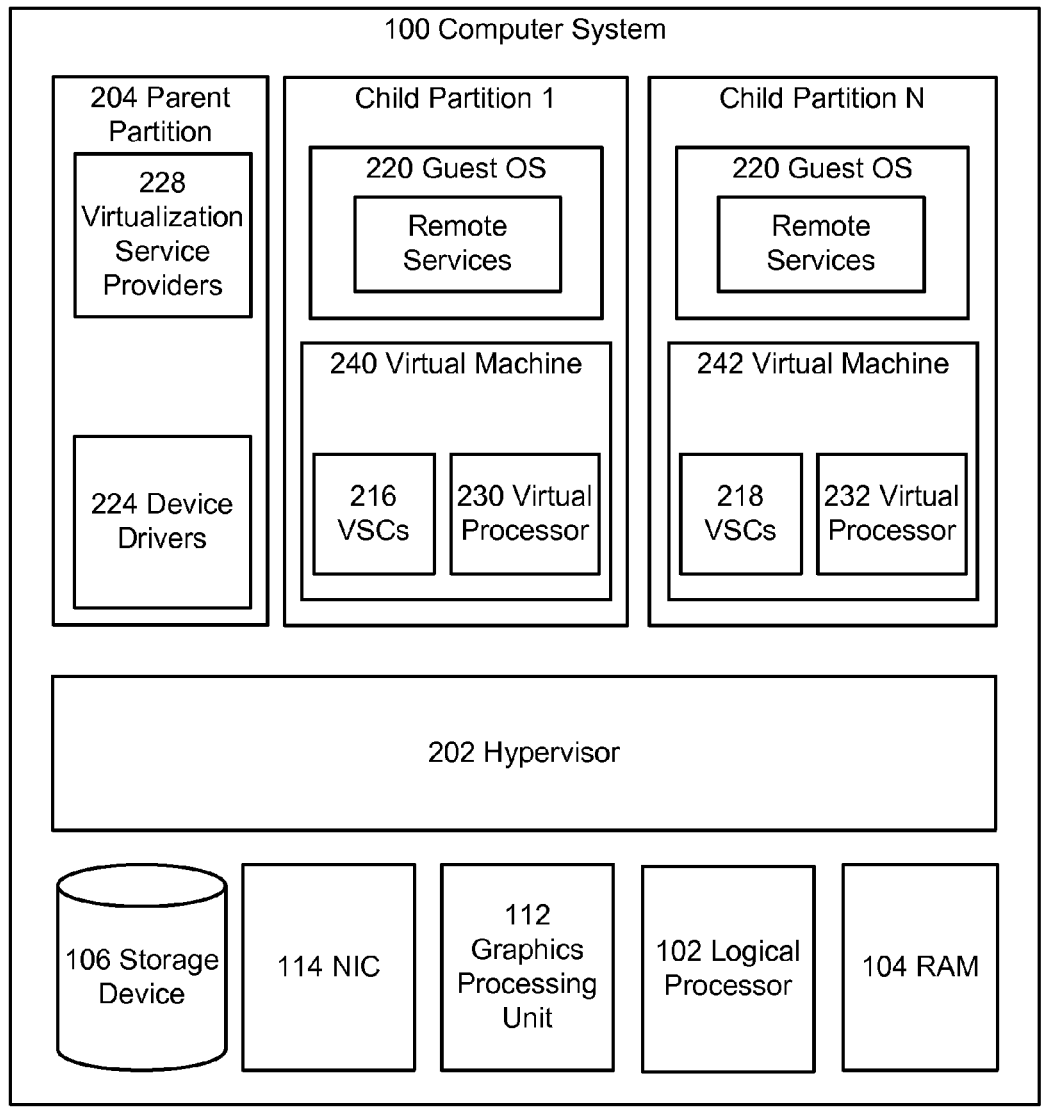
FIG. 3 depicts an operational environment for practicing aspects of the present disclosure.
Figure 4:
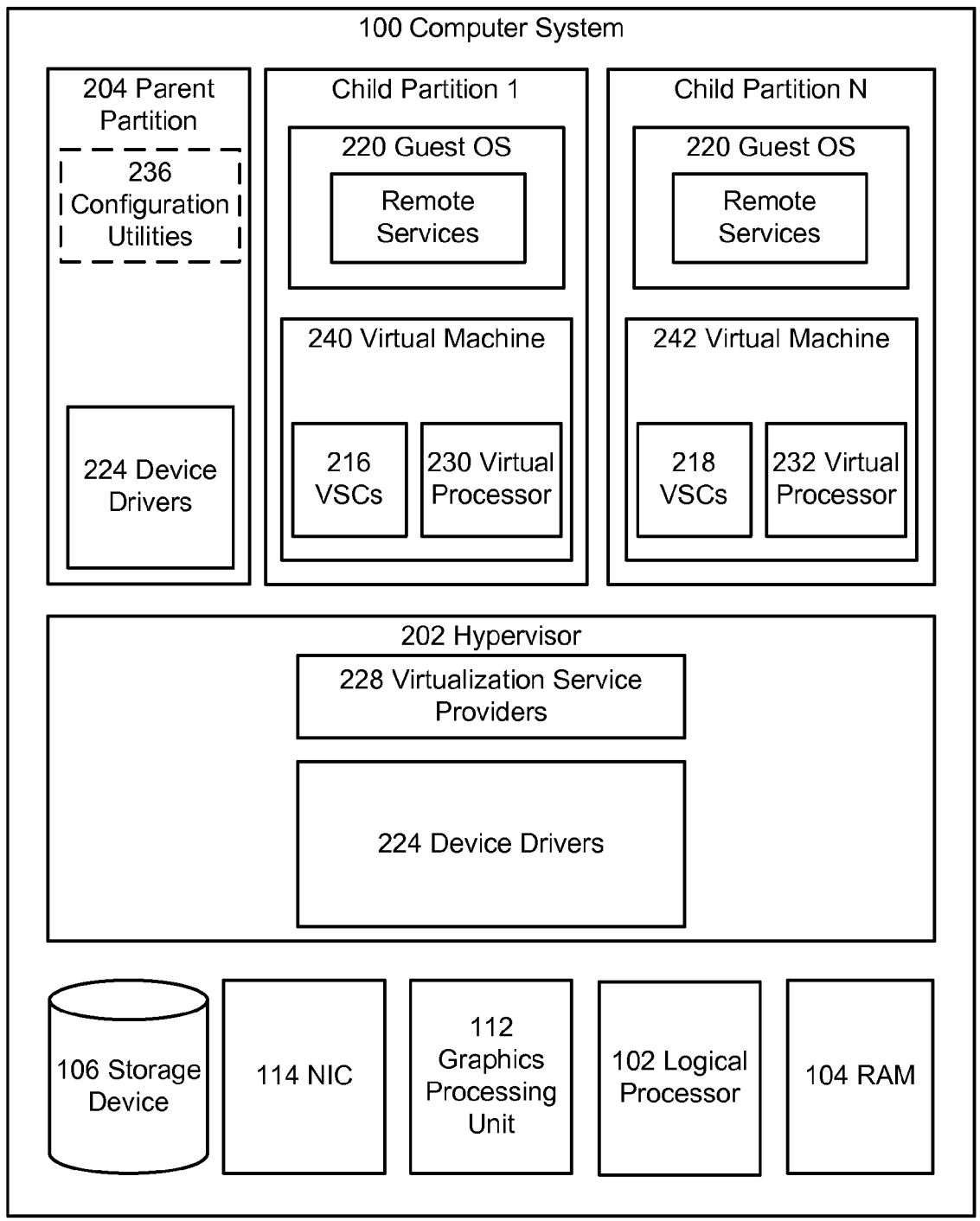
FIG. 4 depicts an operational environment for practicing aspects of the present disclosure.

Referring now to FIGS. 3 and 4, depicted are high level block diagrams of computer systems configured to effectuate virtual machines. As shown in the figures, computer system 100 can include elements described in FIGS. 1 and 2 and components operable to effectuate virtual machines. One such component is a hypervisor 202 that may also be referred to in the art as a virtual machine monitor. The hypervisor 202 in the depicted embodiment can be configured to control and arbitrate access to the hardware of computer system 100. Broadly stated, the hypervisor 202 can generate execution environments called partitions such as child partition 1 through child partition N (where N is an integer greater than or equal to 1). In embodiments a child partition can be considered the basic unit of isolation supported by the hypervisor 202, that is, each child partition can be mapped to a set of hardware resources, e.g., memory, devices, logical processor cycles, etc., that is under control of the hypervisor 202 and/or the parent partition and hypervisor 202 can isolate one partition from accessing another partition's resources. In embodiments the hypervisor 202 can be a stand-alone software product, a part of an operating system, embedded within firmware of the motherboard, specialized integrated circuits, or a combination thereof.

In the above example, computer system 100 includes a parent partition 204 that can also be thought of as domain 0 in the open source community. Parent partition 204 can be configured to provide resources to guest operating systems executing in child partitions 1–N by using virtualization service providers 228 (VSPs) that are also known as back-end drivers in the open source community. In this example architecture the parent partition 204 can gate access to the underlying hardware. The VSPs 228 can be used to multiplex the interfaces to the hardware resources by way of virtualization service clients (VSCs) that are also known as front-end drivers in the open source community. Each child partition can include one or more virtual processors such as virtual processors 230 through 232 that guest operating systems 220 through 222 can manage and schedule threads to execute thereon. Generally, the virtual processors 230 through 232 are executable instructions and associated state information that provide a representation of a physical processor with a specific architecture. For example, one virtual machine may have a virtual processor having characteristics of an Intel x86 processor, whereas another virtual processor may have the characteristics of a PowerPC processor. The virtual processors in this example can be mapped to logical processors of the computer system such that the instructions that effectuate the virtual processors will be backed by logical processors. Thus, in these example embodiments, multiple virtual processors can be simultaneously executing while, for example, another logical processor is executing hypervisor instructions. Generally speaking, and as illustrated by the figures, the combination of virtual processors, various VSCs, and memory in a partition can be considered a virtual machine such as virtual machine 240 or 242.

Generally, guest operating systems 220 through 222 can include any operating system such as, for example, operating systems from Microsoft®, Apple®, the open source community, etc. The guest operating systems can include user/kernel modes of operation and can have kernels that can include schedulers, memory managers, etc. A kernel mode can include an execution mode in a logical processor that grants access to at least privileged processor instructions. Each guest operating system 220 through 222 can have associated file systems that can have applications stored thereon such as remote desktop servers, e-commerce servers, email servers, etc., and the guest operating systems themselves. The guest operating systems 220-222 can schedule threads to execute on the virtual processors 230-232 and instances of such applications can be effectuated.

Referring now to FIG. 4, illustrated is an alternative architecture that can be used to effectuate virtual machines. FIG. 4 depicts similar components to those of FIG. 3, however in this example embodiment the hypervisor 202 can include the virtualization service providers 228 and device drivers 224, and parent partition 204 may contain configuration utilities 236. In this architecture, hypervisor 202 can perform the same or similar functions as the hypervisor 202 of FIG. 2. The hypervisor 202 of FIG. 4 can be a stand alone software product, a part of an operating system, embedded within firmware of the motherboard or a portion of hypervisor 202 can be effectuated by specialized integrated circuits. In this example parent partition 204 may have instructions that can be used to configure hypervisor 202 however hardware access requests may be handled by hypervisor 202 instead of being passed to parent partition 204.

Figure 5:
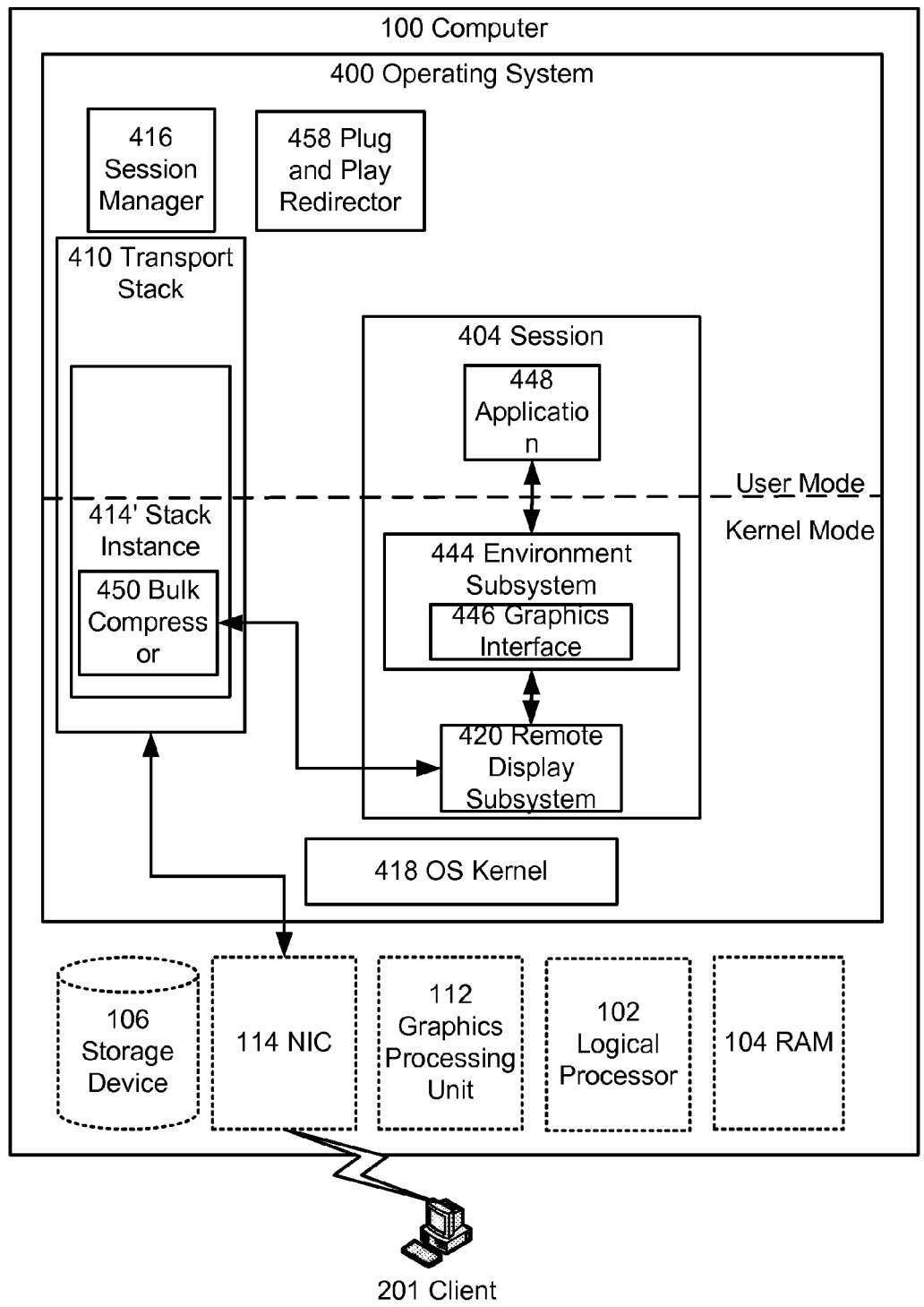
FIG. 5 illustrates a computer system including circuitry for effectuating remote desktop services.

Referring now to FIG. 5, computer 100 may include circuitry configured to provide remote desktop services to connecting clients. In an example embodiment, the depicted operating system 400 may execute directly on the hardware or a guest operating system 220 or 222 may be effectuated by a virtual machine such as VM 216 or VM 218. The underlying hardware 208, 210, 234, 212, and 214 is indicated in the illustrated type of dashed lines to identify that the hardware can be virtualized.

Remote services can be provided to at least one client such as client 401 (while one client is depicted remote services can be provided to more clients.) The example client 401 can include a computer terminal that is effectuated by hardware configured to direct user input to a remote server session and display user interface information generated by the session. In another embodiment, client 401 can be effectuated by a computer that includes similar elements as those of computer 100 FIG. 1*b*. In this embodiment, client 401 can include circuitry configured to effect operating systems and circuitry configured to emulate the functionality of terminals, e.g., a remote desktop client application that can be executed by one or more logical processors 102. One skilled in the art can appreciate that the circuitry configured to effectuate the operating system can also include circuitry configured to emulate a terminal.

Each connecting client can have a session (such as session 404) which allows the client to access data and applications stored on computer 100. Generally, applications and certain operating system components can be loaded into a region of memory assigned to a session. Thus, in certain instances some OS components can be spawned N times (where N represents the number of current sessions). These various OS components can request services from the operating system kernel 418 which can, for example, manage memory; facilitate disk reads/writes; and configure threads from each session to execute on the logical processor 102. Some example subsystems that can be loaded into session space can include the subsystems that generates desktop environments, the subsystems that track mouse movement within the desktop, the subsystems that translate mouse clicks on icons into commands that effectuate an instance of a program, etc. The processes that effectuate these services, e.g., tracking mouse movement, are tagged with an identifier associated with the session and are loaded into a region of memory that is allocated to the session.

A session can be generated by a session manager 416, e.g., a process. For example, the session manager 416 can initialize and manage each remote session by generating a session identifier for a session space; assigning memory to the session space; and generating system environment variables and instances of subsystem processes in memory assigned to the session space. The session manager 416 can be invoked when a request for a remote desktop session is received by the operating system 400.

A connection request can first be handled by a transport stack 410, e.g., a remote desktop protocol (RDP) stack. The transport stack 410 instructions can configure logical processor 102 to listen for connection messages on a certain port and forward them to the session manager 416. When sessions are generated the transport stack 410 can instantiate a remote desktop protocol stack instance for each session. Stack instance 414 is an example stack instance that can be generated for session 404. Generally, each remote desktop protocol stack instance can be configured to route output to an associated client and route client input to an environment subsystem 444 for the appropriate remote session.

As shown by the figure, in an embodiment an application 448 (while one is shown others can also execute) can execute and generate an array of bits. The array can be processed by a graphics interface 446 which in turn can render bitmaps, e.g., arrays of pixel values, that can be stored in memory. As shown by the figure, a remote display subsystem 420 can be instantiated which can capture rendering calls and send the calls over the network to client 401 via the stack instance 414 for the session.

In addition to remoting graphics and audio, a plug and play redirector 458 can also be instantiated in order to remote diverse devices such as printers, mp3 players, client file systems, CD ROM drives, etc. The plug and play redirector 458 can receive information from a client side component which identifies the peripheral devices coupled to the client 401. The plug and play redirector 458 can then configure the operating system 400 to load redirecting device drivers for the peripheral devices of the client 401. The redirecting device drivers can receive calls from the operating system 400 to access the peripherals and send the calls over the network to the client 401.

As discussed above, clients may use a protocol for providing remote presentation services such as Remote Desktop Protocol (RDP) to connect to a resource using terminal services. When a remote desktop client connects to a remote desktop server via a remote desktop server gateway, the gateway may open a socket connection with the remote desktop server and redirect client traffic on the remote presentation port or a port dedicated to remote access services. The gateway may also perform certain gateway specific exchanges with the client using a remote desktop server gateway protocol transmitted over HTTPS.

Figure 6:
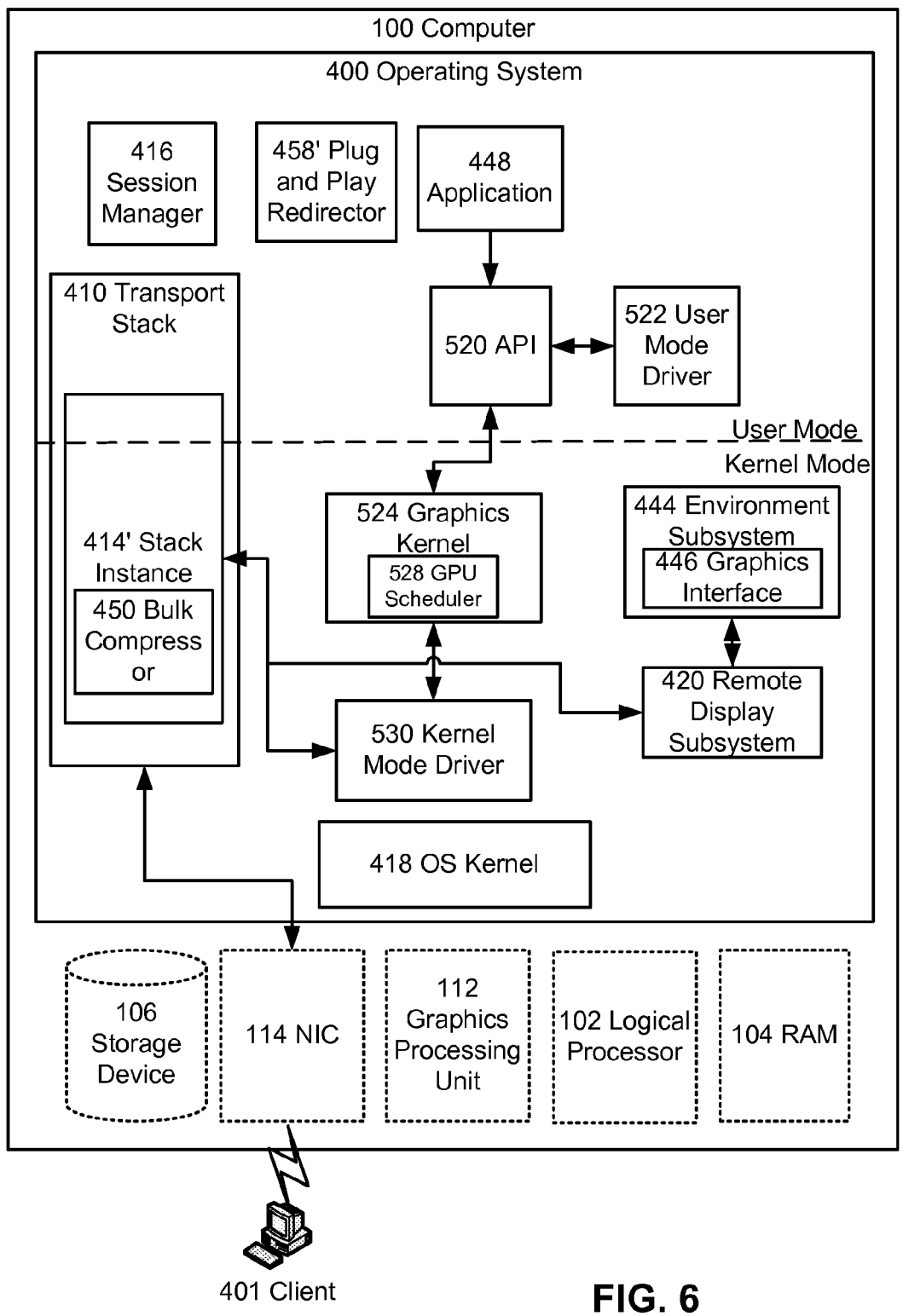
FIG. 6 illustrates a computer system including circuitry for effectuating remote services.

Turning to FIG. 6, depicted is a computer system 100 including circuitry for effectuating remote services and for incorporating aspects of the present disclosure. As shown by the figure, in an embodiment a computer system 100 can include components similar to those described in FIG. 2 and FIG. 5, and can effectuate a remote presentation session. In an embodiment of the present disclosure a remote presentation session can include aspects of a console session, e.g., a session spawned for a user using the computer system, and a remote session. Similar to that described above, the session manager 416 can initialize and manage the remote presentation session by enabling/disabling components in order to effectuate a remote presentation session.

One set of components that can be loaded in a remote presentation session are the console components that enable high fidelity remoting, namely, the components that take advantage of 3D graphics and 2D graphics rendered by 3D hardware.

3D/2D graphics rendered by 3D hardware can be accessed using a driver model that includes a user mode driver 522, an API 520, a graphics kernel 524, and a kernel mode driver 530. An application 448 (or any other process such as a user interface that generates 3D graphics) can generate API constructs and send them to an application programming interface 520 (API) such as Direct3D from Microsoft®. The API 520 in turn can communicate with a user mode driver 522 which can generates primitives, e.g., the fundamental geometric shapes used in computer graphics represented as vertices and constants which are used as building blocks for other shapes, and stores them in buffers, e.g., pages of memory. In one embodiment the application 448 can declare how it is going to use the buffer, e.g., what type of data it is going to store in the buffer. An application, such as a videogame, may use a dynamic buffer to store primitives for an avatar and a static buffer for storing data that will not change often such as data that represents a building or a forest.

Continuing with the description of the driver model, the application can fill the buffers with primitives and issue execute commands. When the application issues an execute command the buffer can be appended to a run list by the kernel mode driver 530 and scheduled by the graphics kernel scheduler 528. Each graphics source, e.g., application or user interface, can have a context and its own run list. The graphics kernel 524 can be configured to schedule various contexts to execute on the graphics processing unit 112. The GPU scheduler 528 can be executed by logical processor 102 and the scheduler 528 can issue a command to the kernel mode driver 530 to render the contents of the buffer. The stack instance 414 can be configured to receive the command and send the contents of the buffer over the network to the client 401 where the buffer can be processed by the GPU of the client.

Illustrated now is an example of the operation of a virtualized GPU as used in conjunction with an application that calls for remote presentation services. Referring to FIG. 6, in an embodiment a virtual machine session can be generated by a computer 100. For example, a session manager 416 can be executed by a logical processor 102 and a remote session that includes certain remote components can be initialized. In this example the spawned session can include a kernel 418, a graphics kernel 524, a user mode display driver 522, and a kernel mode display driver 530. The user mode driver 522 can generate graphics primitives that can be stored in memory. For example, the API 520 can include interfaces that can be exposed to processes such as a user interface for the operating system 400 or an application 448. The process can send high level API commands such as such as Point Lists, Line Lists, Line Strips, Triangle Lists, Triangle Strips, or Triangle Fans, to the API 420. The API 520 can receive these commands and translate them into commands for the user mode driver 522 which can then generate vertices and store them in one or more buffers. The GPU scheduler 528 can run and determine to render the contents of the buffer. In this example the command to the graphics processing unit 112 of the server can be captured and the content of the buffer (primitives) can be sent to client 401 via network interface card 114. In an embodiment, an API can be exposed by the session manager 416 that components can interface with in order to determine whether a virtual GPU is available.

In an embodiment a virtual machine such as virtual machine 240 of FIG. 3 or 4 can be instantiated and the virtual machine can serve as a platform for execution for the operating system 400. Guest operating system 220 can embody operating system 400 in this example. A virtual machine may be instantiated when a connection request is received over the network. For example, the parent partition 204 may include an instance of the transport stack 410 and may be configured to receive connection requests. The parent partition 204 may initialize a virtual machine in response to a connection request along with a guest operating system including the capabilities to effectuate remote sessions. The connection request can then be passed to the transport stack 410 of the guest operating system 220. In this example each remote session may be instantiated on an operating system that is executed by its own virtual machine.

In one embodiment a virtual machine can be instantiated and a guest operating system 220 embodying operating system 400 can be executed. Similar to that described above, a virtual machine may be instantiated when a connection request is received over the network. Remote sessions may be generated by an operating system. The session manager 416 can be configured to determine that the request is for a session that supports 3D graphics rendering and the session manager 416 can load a console session. In addition to loading the console session the session manager 416 can load a stack instance 414' for the session and configure system to capture primitives generated by a user mode display driver 522.

The user mode driver 522 may generate graphics primitives that can be captured and stored in buffers accessible to the transport stack 410. A kernel mode driver 530 can append the buffers to a run list for the application and a GPU scheduler 528 can run and determine when to issue render commands for the buffers. When the scheduler 528 issues a render command the command can be captured by, for example, the kernel mode driver 530 and sent to the client 401 via the stack instance 414'.

The GPU scheduler 528 may execute and determine to issue an instruction to render the content of the buffer. In this example the graphics primitives associated with the instruction to render can be sent to client 401 via network interface card 114.

In an embodiment, at least one kernel mode process can be executed by at least one logical processor 112 and the at least one logical processor 112 can synchronize rendering vertices stored in different buffers. For example, a graphics processing scheduler 528, which can operate similarly to an operating system scheduler, can schedule GPU operations. The GPU scheduler 528 can merge separate buffers of vertices into the correct execution order such that the graphics processing unit of the client 401 executes the commands in an order that allows them to be rendered correctly.

One or more threads of a process such as a videogame may map multiple buffers and each thread may issue a draw command. Identification information for the vertices, e.g., information generated per buffer, per vertex, or per batch of vertices in a buffer, can be sent to the GPU scheduler 528. The information may be stored in a table along with identification information associated with vertices from the same, or other processes and used to synchronize rendering of the various buffers.

An application such as a word processing program may execute and declare, for example, two buffers—one for storing vertices for generating 3D menus and the other one storing commands for generating letters that will populate the menus. The application may map the buffer and; issue draw commands. The GPU scheduler 528 may determine the order for executing the two buffers such that the menus are rendered along with the letters in a way that it would be pleasing to look at. For example, other processes may issue draw commands at the same or a substantially similar time and if the vertices were not synchronized vertices from different threads of different processes could be rendered asynchronously on the client 401 thereby making the final image displayed seem chaotic or jumbled.

A bulk compressor 450 can be used to compress the graphics primitives prior to sending the stream of data to the client 401. In an embodiment the bulk compressor 450 can be a user mode (not shown) or kernel mode component of the stack instance 414 and can be configured to look for similar patterns within the stream of data that is being sent to the client 401. In this embodiment, since the bulk compressor 450 receives a stream of vertices, instead of receiving multiple API constructs, from multiple applications, the bulk compressor 450 has a larger data set of vertices to sift through in order to find opportunities to compress. That is, since the vertices for a plurality of processes are being remoted, instead of diverse API calls, there is a larger chance that the bulk compressor 450 will be able to find similar patterns in a given stream.

In an embodiment, the graphics processing unit 112 may be configured to use virtual addressing instead of physical addresses for memory. Thus, the pages of memory used as buffers can be paged to system RAM or to disk from video memory. The stack instance 414' can be configured to obtain the virtual addresses of the buffers and send the contents from the virtual addresses when a render command from the graphics kernel 528 is captured.

An operating system 400 may be configured, e.g., various subsystems and drivers can be loaded to capture primitives and send them to a remote computer such as client 401. Similar to that described above, a session manager 416 can be executed by a logical processor 102 and a session that includes certain remote components can be initialized. In this example the spawned session can include a kernel 418, a graphics kernel 524, a user mode display driver 522, and a kernel mode display driver 530.

A graphics kernel may schedule GPU operations. The GPU scheduler 528 can merge separate buffers of vertices into the correct execution order such that the graphics processing unit of the client 401 executes the commands in an order that allows them to be rendered correctly.

All of these variations for implementing the above mentioned partitions are just exemplary implementations, and nothing herein should be interpreted as limiting the disclosure to any particular virtualization aspect.

Classification Algorithm for Selecting Optimal Image Encoder Based on Image Content The process of compressing, encoding and decoding graphics data as referred to herein may generally use one or more methods and systems described in commonly assigned U.S. Pat. No. 7,460,725 entitled "System And Method For Effectively Encoding And Decoding Electronic Information," hereby incorporated by reference in its entirety.

In various methods and systems disclosed herein, improvements to the transmission of remote presentation graphics data to a client computer may be implemented to provide a more timely and rich user experience. The embodiments disclosed herein for encoding and transmitting graphics data may be implemented using various combinations of hardware and software processes. In some embodiments, functions may be executed entirely in hardware. In other embodiments, functions may be performed entirely in software. In yet further embodiments, functions may be implemented using a combination of hardware and software processes. Such processes may further be implemented using one or more CPUs and/or one or more specialized processors such as a graphics processing unit (GPU) or other dedicated graphics rendering devices.

In remote desktop scenarios the graphics content of a user's desktop located on a host computer (e.g., the server) is typically streamed to another computer (e.g., the client). The server and the client will exchange the desktop graphics data in a well defined protocol or format. Microsoft's™ Remote Desktop Protocol (RDP) is an example of such a protocol. The RDP protocol is a stream oriented protocol that may use a stream based transport such as the Transmission Control Protocol (TCP) for exchanging data with the client. Protocols such as the TCP protocol typically exhibit inconsistent throughput especially when the underlying transport is a wide area network (WAN) connection. If such a link is used for RDP traffic, such unpredictable throughput may result in a negative user experience because the desktop graphics data may be delivered to the client in a time delayed fashion.

Figure 7:
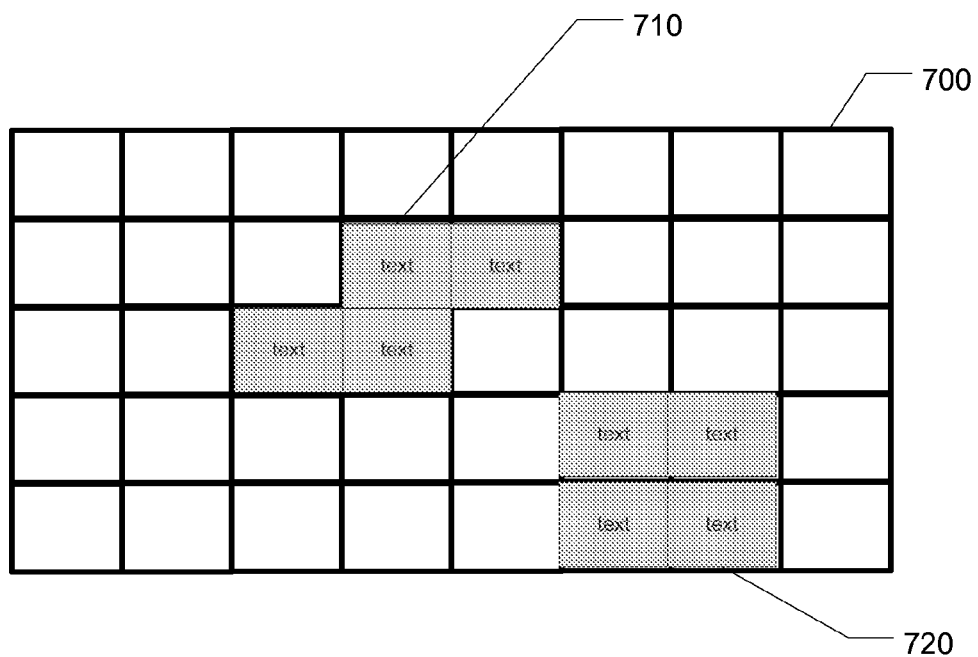
FIG. 7 illustrates an example of dividing a captured frame.

FIG. 7 depicts an example user screen 700 of a user's desktop divided into rectangular tiles. The desktop may be "tiled" in equally sized bitmaps, which may then be represented as a frame. In this example, the darkened tiles 710 and 720 represent tiles that have changed and are to be sent to the client. Thus in this case the frame that is sent to the client will contain two types of graphics elements. The tiles that are not changed may be represented as empty rectangles. The tiles that have changed may actually be sent as encoded bitmaps.

The methods disclosed herein are not limited to a particular type of graphics data such as bitmaps. The disclosed methods can apply to any type of graphic object. For example, the graphics data may comprise a description of entities to be drawn. Generally the lossless channel can be used to notify the client of the type and nature of the data that will be transmitted and the expected result after rendering. The actual graphics data can then be transmitted to the client on the lossy channel, and the client can compare what was actually received and the result of the rendering actions to determine if any data was missing or if there is a discrepancy between what was expected in the received data or as a result of performing the expected actions on the data. In one embodiment the client can note any transactions not received or screen areas that have not been updated and notify the server of the discrepancy. In other embodiments, the client make some intelligent decisions such as determining that only a small portion of the screen is missing and determining to wait longer for the missing data or determine that the data is not needed.

Furthermore, while the following descriptions are provided in the context of remote presentation systems, it should be understood that the disclosed embodiments may be implemented in any type of system in which graphics data is encoded and compressed for delivery over a network.

Remote presentation compression algorithms are employed to reduce the bandwidth of the display stream to levels that are acceptable for transmission over local area networks, wide area networks, and low-bandwidth networks. Such algorithms typically trade off CPU time on the server side for a lower required bandwidth. Compression algorithms may work well on certain image content. However, the algorithms may perform poorly on other types of content. For example, compression algorithms may work well on text but not on natural images. The output of these compression encoders may not be the final stage to the network as there may be other layers involved such as bulk compression and remote presentation packet encapsulation. These other layers may also effect overall bandwidth usage. In some cases an image that encodes well with one bitmap encoder (codec) may compresses poorly with the remote presentation bulk compressor prior to network transmission. In fact, the end result of these processes may in some cases be an encoded and compressed payload that is larger than the original bitmap.

Figure 8:
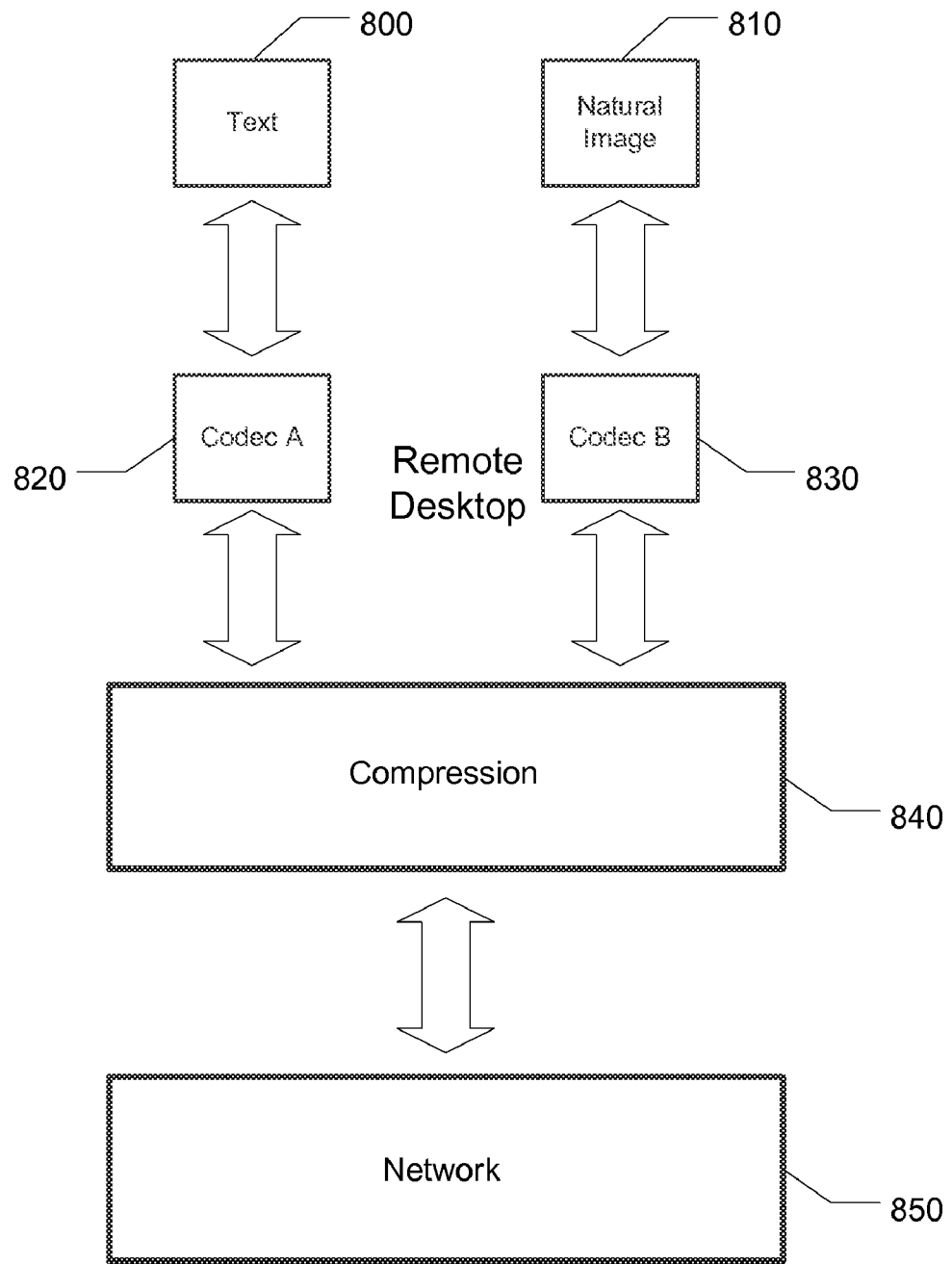
FIG. 8 illustrates an example of selecting a codec based on data content.

Many systems simply classify image data as one of two types such as text and other images. For example, referring to FIG. 8, a bitmap of a text image 800 and a bitmap of a natural image 810 may be associated with codec A (820) and codec B (830), respectively. The encoded data may be compressed by a compression function 840 before placing on the network 850 for transmission. However, in many cases codec B (830) may not be the optimal encoder for some bitmaps, the result being that the compression process 840 ultimately produces data that is ill-suited for efficient transport over the network 850.

To lower overall network bandwidth usage, an encoding method may be selected based on how the image content relates to the final bandwidth used rather than using predetermined selection criteria for text, simple/block diagrams, natural images, and the like. Rather than providing a classifier and target (sub) codecs for each possible classified output, the output may be classified based on a range using multiple image and compression characteristics. A decision function may then be tuned based on the network traffic conditions. Thus an encoder may be selected that in turn ultimately results in the best compression ratio at the end of the process and prior to transmission of the data onto the network.

In various embodiments, methods and systems are disclosed for the dynamic runtime implementation and end-to-end biased tuning of a two stage image classification system based on a decision function that uses network packet sizes and multiple image characteristics to determine the selection of an encoding codec to reduce overall network bandwidth consumption.

Most classification systems classify image regions based on high level criteria such as frequency content which is then used to choose tightly coupled internal sub-encoders for those image regions.

In one embodiment, each codec and all subsequent networking encoding stages may be considered as a single black box, thus allowing the box to optimize network bandwidth consumption more accurately than can be performed even with complete understanding of all available image encoding codecs. The classification system itself does not output a single type of classification (such as text or natural image) but instead may output a range of values, thus allowing use with a wide range of backend encoders via a tunable decision function.

Figure 9:
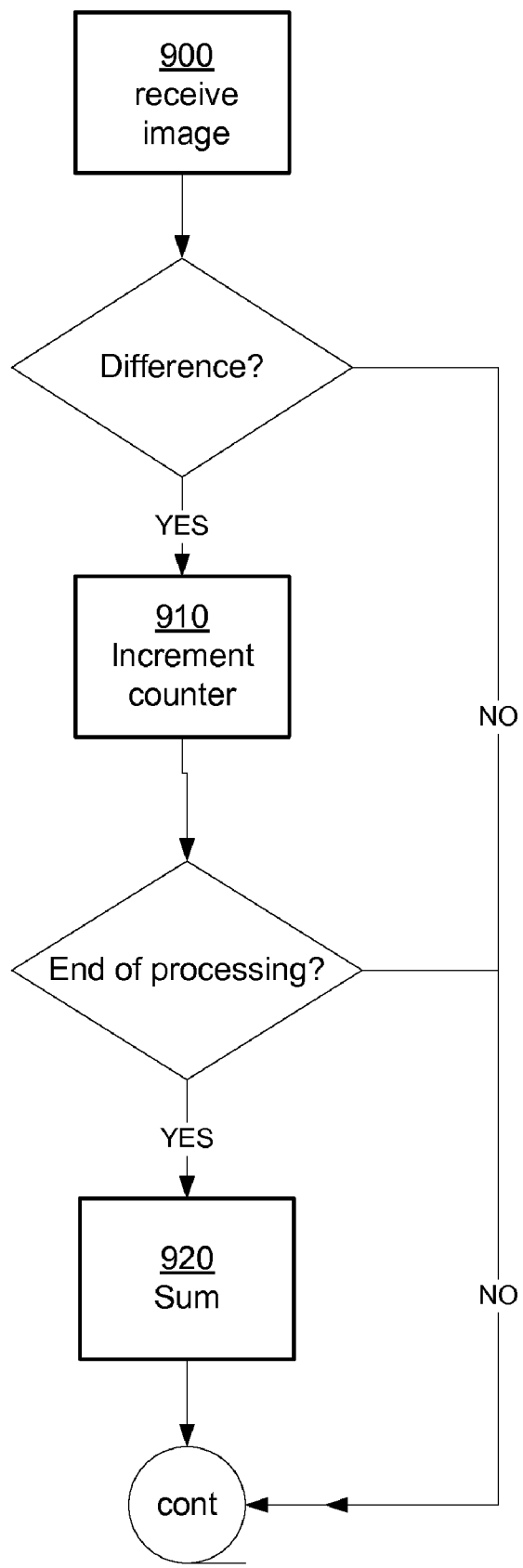
FIG. 9 illustrates an example of processing data content.

In one embodiment, a classification system may comprise the following components:
  (A) Flexible Image Classifier (Runtime and Tuning)
  (B) Tuning System
  (C) Run Time Decision Function
  (D) Backend RDP Bitmap Encoders The flexible image classifier may use two primary types of image feature classification. The first type may be rate change based and the second type may be a modified color histogram. Referring to FIG. 9, the first type using rate change may be calculated based on differences between image pixels based on their color intensities. An image may be received 900 for analysis and processing. Differences in selected parameters of the image may be calculated and tracked. For a given parameter, if a difference is detected, then a counter may be incremented 910. For RGB values, differences may be calculated row by row (contiguous memory) and for each R, G or B value that is different than the previous pixels value, a counter may be incremented. The various counters may be summed at the end of processing 920. For RGB values, the individual RGB change counters may be summed at the end of processing, thus providing four change values.

Figure 10:
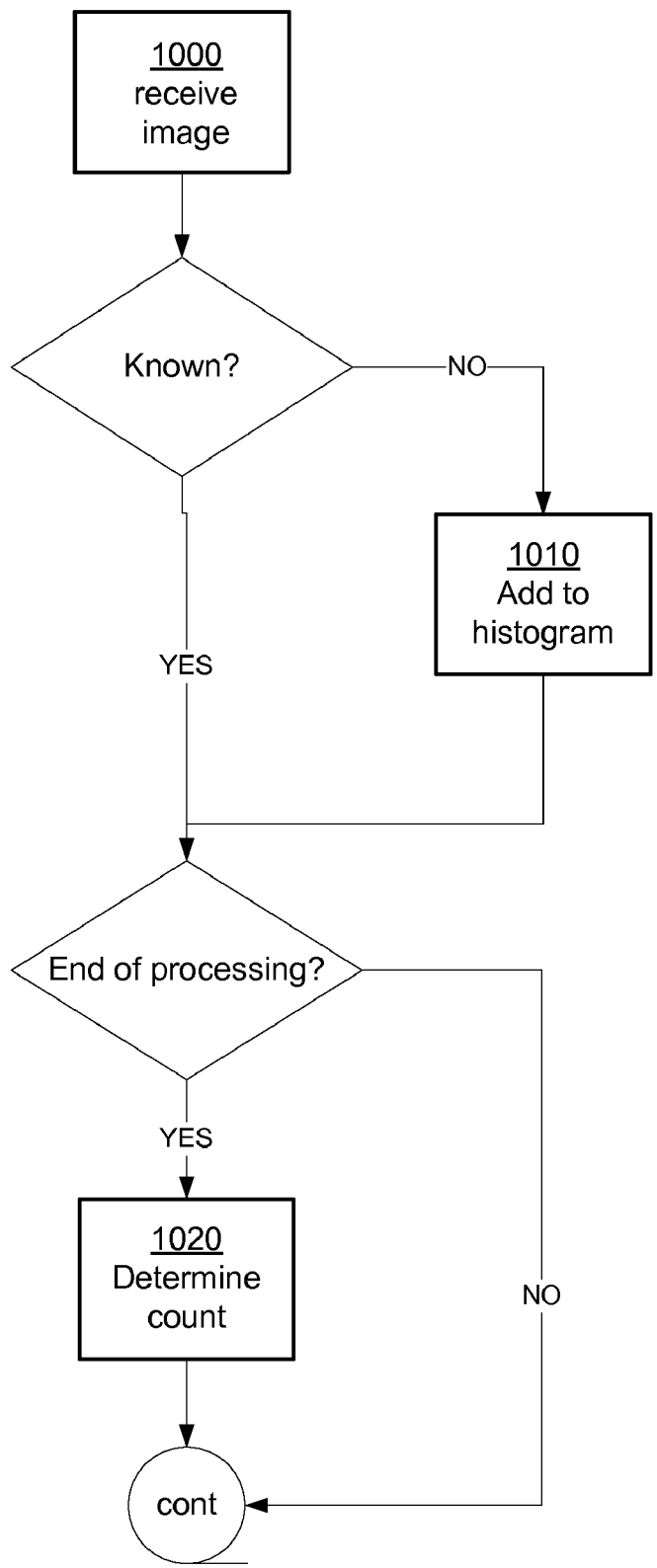
FIG. 10 illustrates an example of processing data content.

Referring to FIG. 10, be a modified color histogram may be used to classify data. An image may be received 1000 for analysis and processing. As the selected parameters are examined, occurrences of the parameters may be tracked. As new parameter values are detected, the occurrence may be noted in the histogram 1010. For RGB values, as each R, G, or B value is examined, the occurrence may be tracked in an array of known colors so that a histogram of all colors may be maintained. At the end of processing, this histogram may be examined and a count of unique parameters may be compiled 1020. For RGB values, at the end of processing the histogram may be examined and a count of unique colors may be compiled as well as counts for each of the R, G, and B colors.

The counts may be used for frequency analysis as well as color content comparisons without the need to perform color space conversions, edge detection (via Laplacian operators) or temporal to frequency conversions (via FFTs). This may allow for runtime inline use of this classification algorithm without degrading system performance while maintaining flexibility of decision function methods.

In an embodiment of a tuning system, a set of known images representative of the target system usage may be used and the images may be tested against each available encoding codec and the flexible image classifier. Additionally, the output of each encoding codec may be bulk compressed as it would appear on the network in a remote presentation network stream. The tuning system may then take these values and exhaustively test each characteristic output in the flexible image classifier against the bitmap encoding sizes. These sizes may be scaled using the bulk compression results. The result is a set of data for the response of the system based on the tuning characteristics output from the classifier. The most stable local minimum may be selected to obtain the characteristic of interest and its threshold value.

The tuning method described above may allow for the tuning of the decision function based on the final network traffic output rather than using only the codec encoded output sizes. Accordingly, the use of codecs that encode well but poorly bulk compress may be avoided, allowing for the overall traffic on the network to be increased.

In one embodiment, a run time decision function may be provided that uses the output from the flexible image classifier and the tuning value determined by the tuning system to select an optimal remote presentation bitmap encoder. The disclosed embodiments may be used with any type of bitmap and other encoders that may be used in conjunction with the encoding and transmission of graphics data. Encoders may be added executing the flexible image classifier and tuning system with the new encoders.

A link characteristics detector may incorporate some of the functionality described in commonly assigned U.S. patent application Ser. No. 12/719,669, filed on Mar. 8, 2010, hereby incorporated in its entirety.

Figure 11:
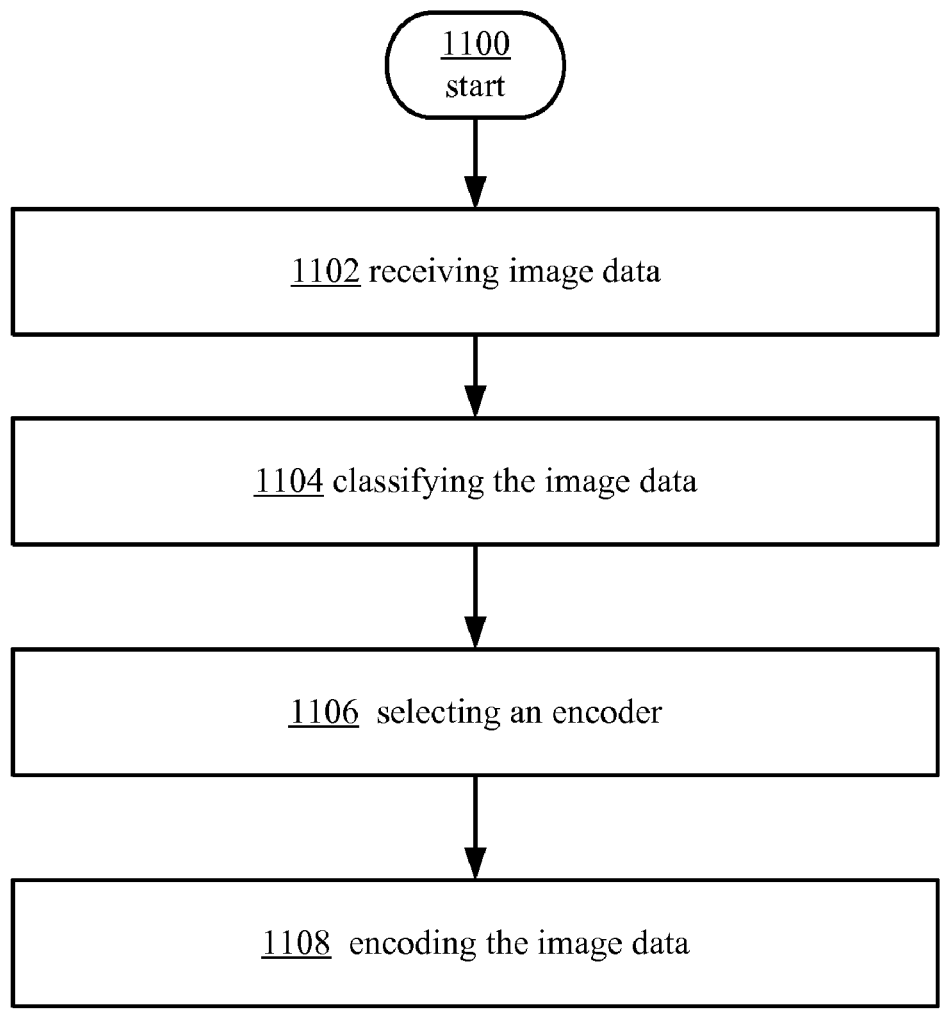
FIG. 11 illustrates an example of an operational procedure for processing graphics data for transmission to a client computer.

FIG. 11 depicts an exemplary operational procedure for transmitting remote presentation data from a computing device to a client computing device including operations 1100, 1102, 1104, 1106, and 1108. Referring to FIG. 11, operation 1100 begins the operational procedure and operation 1102 illustrates receiving image data for transmission to a client computing device. The image data may represent, for example, a portion of a user screen to be rendered on the client computing device. In an embodiment the image data may comprise bitmap data. Operation 1104 illustrates classifying the image data so as to determine the type of data contained therein. Such a classification may involve determining a rate of change of the image data. The classification may additionally and optionally include maintaining a histogram of the colors in the image. Operation 1106 illustrates selecting one of a plurality of encoders based on the classification. The selection of the encoder may also consider the current network conditions. Operation 1108 illustrates encoding the received image data using the selected encoder.

Figure 12:
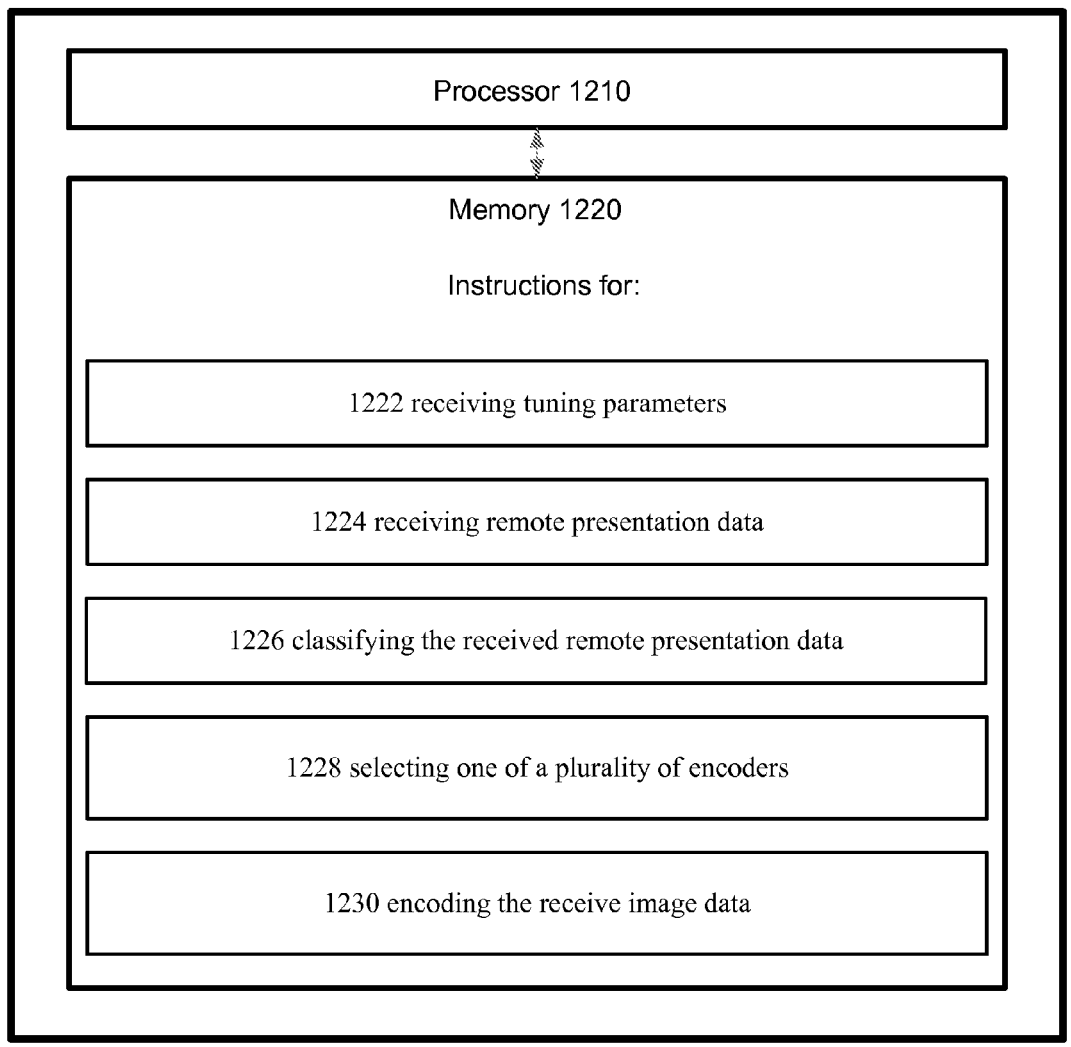
FIG. 12 illustrates an example system for incorporating aspects of the present disclosure.

FIG. 12 depicts an exemplary system for transmitting remote presentation data to a client computer as described above. Referring to FIG. 12, system 1200 comprises a processor 1210 and memory 1220. Memory 1220 further comprises computer instructions configured to transmit remote presentation data to a client computer. Block 1222 illustrates receiving tuning parameters for selecting one of a plurality of graphics encoders configured to encode a plurality of remote presentation data types. Block 1224 illustrates receiving remote presentation data for transmission to the client computer. Block 1226 illustrates classifying the received remote presentation data based on said tuning parameters. Block 1228 illustrates selecting one of the plurality of encoders based on said classifying and link data indicative of network conditions. Block 1230 illustrates encoding the receive image data using the selected encoder.

Figure 13:
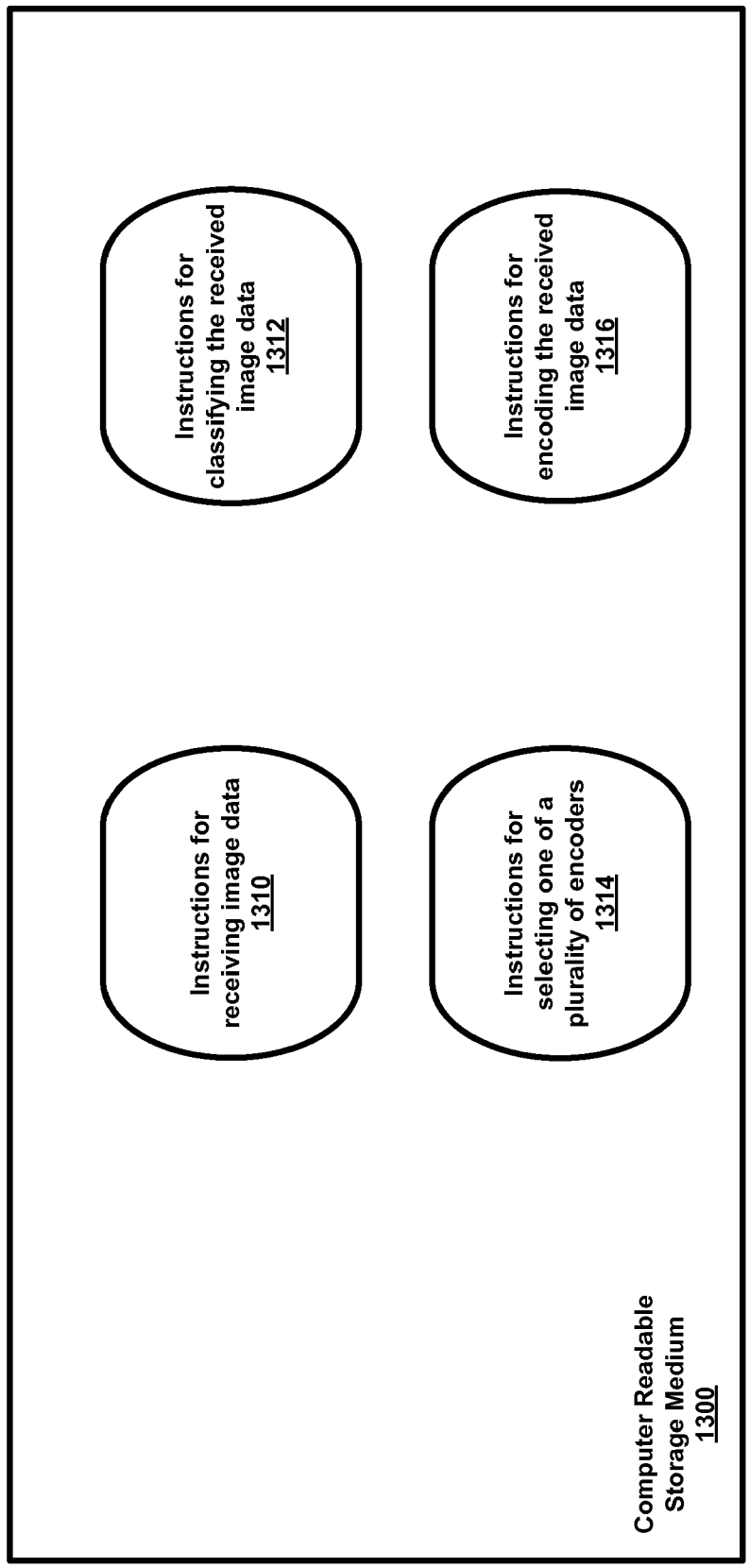
FIG. 13 illustrates a computer readable medium bearing computer executable instructions discussed with respect to FIGS. 1-12.

Any of the above mentioned aspects can be implemented in methods, systems, computer readable media, or any type of manufacture. For example, per FIG. 13, a computer readable medium can store thereon computer executable instructions for transmitting graphics data. Such media can comprise a first subset of instructions for receiving image data for transmission to a client computer 1310; a second subset of instructions for classifying the received image data 1312; a third subset of instructions for selecting one of a plurality of encoders based on said classifying, link data indicative of network conditions, and tuning parameters, wherein the tuning parameters are configured to identify encoding characteristics that substantially optimizes a compression ratio resulting from a bulk compression process 1314; and a fourth subset of instructions for encoding the received image data using the selected encoder. It will be appreciated by those skilled in the art that additional sets of instructions can be used to capture the various other aspects disclosed herein, and that the four presently disclosed subsets of instructions can vary in detail per the present disclosure.

The foregoing detailed description has set forth various embodiments of the systems and/or processes via examples and/or operational diagrams. Insofar as such block diagrams, and/or examples contain one or more functions and/or operations, it will be understood by those within the art that each function and/or operation within such block diagrams, or examples can be implemented, individually and/or collectively, by a wide range of hardware, software, firmware, or virtually any combination thereof.

It should be understood that the various techniques described herein may be implemented in connection with hardware or software or, where appropriate, with a combination of both. Thus, the methods and apparatus of the disclosure, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the disclosure. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the disclosure, e.g., through the use of an application programming interface (API), reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

While the invention has been particularly shown and described with reference to a preferred embodiment thereof, it will be understood by those skilled in the art that various changes in form and detail may be made without departing from the scope of the present invention as set forth in the following claims. Furthermore, although elements of the invention may be described or claimed in the singular, the plural is contemplated unless limitation to the singular is explicitly stated.

What is claimed:

1. A computer-implemented method for transmitting graphics data from a computing device to a client computing device, the method comprising:
    classifying, by a computing device, image data for transmission to the client computing device based on tuning parameters for selecting one of a plurality of graphics encoders, the tuning parameters derived from analysis of images for one of a plurality of encoders;
    selecting, by the computing device, one of the plurality of encoders based on said classifying and link data indicative of network conditions; and
    encoding, by the computing device, the image data using the selected encoder, wherein said selected encoder substantially optimizes a compression ratio resulting from bulk compressing the encoded image data.

2. The computer-implemented method of claim 1, wherein said classifying comprises determining a rate of change of the image data.

3. The computer-implemented method of claim 2, wherein said determining comprises determining the rate of change of RGB values.

4. The computer-implemented method of claim 1, wherein said classifying comprises maintaining a color histogram.

5. The computer-implemented method of claim 3, wherein said determining comprises calculating differences by pixel rows and for each R, G or B value that is different than a previous pixel value, incrementing a counter.

6. The computer-implemented method of claim 5, further comprising summing individual RGB change counters.

7. The computer-implemented method of claim 4, wherein said maintaining comprises maintaining occurrences of color values in an array of colors.

8. The computer-implemented method of claim 7, further comprising determining a count of unique colors and counts for each of R, G, and B color.

9. The computer-implemented method of claim 8, further comprising using the counts for frequency analysis and color content comparison.

10. The computer-implemented method of claim 1, wherein the image data is bitmap data.

11. The computer-implemented method of claim 1, wherein the method is performed in conjunction with a remote presentation protocol.

12. A system configured to transmit remote presentation data to a client computer, comprising:
- at least one processor; and
- at least one memory communicatively coupled to said at least one processor when the system is operational, the memory having stored therein computer-executable instructions that, upon execution by the processor, cause:
- receiving tuning parameters for selecting one of a plurality of graphics encoders operable to encode a plurality of remote presentation data types, the tuning parameters derived from analysis of images for one of the plurality of graphics encoders;
- receiving remote presentation data for transmission to the client computer;
- classifying the received remote presentation data based on said tuning parameters;
- selecting one of the plurality of graphics encoders based on said classifying and link data indicative of network conditions; and
- encoding the received image data using the selected graphics encoder.

13. The system of claim 12, wherein said determining comprises determining the rate of change of RGB values.

14. The system of claim 13, wherein said determining further comprises maintaining a color histogram.

15. The system of claim 14, wherein said determining comprises:
- calculating differences by pixel rows and for each R, G or B value that is different than a previous pixel value, incrementing a counter;
- maintaining occurrences of color values in an array of colors; and
- determining a count of unique colors and counts for each of R, G, and B color.

16. A computer readable storage medium storing thereon computer executable instructions for transmitting graphics data, said instructions for:
- receiving image data for transmission to a client computer;
- classifying the received image data;
- selecting one of a plurality of encoders based on said classifying, link data indicative of network conditions, and tuning parameters, wherein the tuning parameters are operable to identify encoding characteristics that substantially optimizes a compression ratio resulting from a bulk compression process, the tuning parameters being derived from analysis of images for one of the plurality of encoders; and
- encoding the received image data using the selected encoder.

17. The computer readable storage medium of claim 16, wherein said classifying comprises determining a rate of change of the received image data.

18. The computer readable storage medium of claim 17, wherein said classifying comprises maintaining a color histogram.

19. The computer readable storage medium of claim 16, wherein the selected encoder substantially optimizes a compression ratio resulting from bulk compressing the encoded image data.

20. The computer readable storage medium of claim 16, wherein each of the plurality of encoders is substantially optimized for a type of image data.

* * * * *